United States Patent [19]

Murakami et al.

[11] Patent Number: 5,365,296
[45] Date of Patent: Nov. 15, 1994

[54] MOTOR AND AN OPTICAL APPARATUS HAVING SUCH MOTOR

[75] Inventors: Junichi Murakami, Yokohama; Shigeru Ogino, Tokyo; Hiroyuki Wada; Hiroyuki Takahara, both of Yokohama, all of Japan

[73] Assignee: Canon Kabushiki Kaisha, Tokyo, Japan

[21] Appl. No.: 783,994

[22] Filed: Oct. 29, 1991

[30] Foreign Application Priority Data

Oct. 30, 1990 [JP] Japan ................. 2-2292510
Oct. 14, 1991 [JP] Japan ................. 3-264766

[51] Int. Cl.⁵ .................. G03B 1/18; H01L 41/04
[52] U.S. Cl. ................... 354/195.1; 310/332
[58] Field of Search ............ 354/195.1, 457; 310/332, 328

[56] References Cited

U.S. PATENT DOCUMENTS 4,291,958 9/1981 Frank et al. ............... 354/25
4,303,324 12/1981 Marcus ..................... 354/195
4,601,539 7/1986 Watanabe .................. 350/255
4,920,369 4/1990 Kaneda et al. ............. 354/400
5,101,278 3/1992 Itsumi et al. .............. 358/227

FOREIGN PATENT DOCUMENTS 55-100059 7/1980 Japan.

Primary Examiner—Michael L. Gellner
Assistant Examiner—Nicholas J. Tuccillo
Attorney, Agent, or Firm—Fitzpatrick, Cella, Harper & Scinto

[57] ABSTRACT

A motor for driving a moving member with respect to a member which serves as a reference of the movement includes at least two first piezoelectric actuators for operating an operating portion thereof such that it is brought into contact with and is moved away from said member, and at least one second piezoelectric actuator operating such that it changes a distance between the plurality of first piezoelectric actuators. At least one of the plurality of first piezoelectric actuators employs a bimorph type piezoelectric element.

25 Claims, 11 Drawing Sheets

MOTOR AND AN OPTICAL APPARATUS HAVING SUCH MOTOR

BACKGROUND OF THE INVENTION

1. Field of the Invention

The present invention relates to a linear motor which employs a piezoelectric element, and an optical apparatus in which a lens is moved by such linear motor.

2. Related Background Art

In recent years, progress in electronic technologies has increased the demand for developing fine motion driving sources or high-accuracy fine motion mechanisms in the field of mechanics. Accordingly, driving sources or fine motion mechanisms which utilize fine deformity of an object or of a substance have been used as the driving source for the fine moving of mechanisms or for finely positioning mechanisms. The most commonly used driving source among them uses a piezoelectric element, and various types of such piezoelectric type motors have been proposed, some of which have been put into practical use. However, most of the previously proposed piezoelectric motors have not yet been put into practical use because they still have drawback to be solved.

The fine and linear motion mechanism disclosed in Japanese Patent Laid-Open No. 55-100059 is an example of an application of a piezoelectric linear motor constructed using a piezoelectric element, and has a potential of being put into practical use.

FIG. 11 schematically shows a linear fine motion mechanism or a piezoelectric linear motor disclosed in the aforementioned patent application. The piezoelectric linear motor has laminated piezoelectric elements 101, 102a, 102b, 103a and 103b. These piezoelectric elements are held by a pair of retaining members 104 and 105 each having a T-shaped cross-section, as shown in FIG. 11. The first laminated piezoelectric element 101 can expand and contract parallel to a guide rail 106 in a direction indicated by A. The second laminated piezoelectric elements 102a and 102b and the third laminated piezoelectric elements 103a and 103b can expand and contract in a direction perpendicular to the direction indicated by A, i.e., toward the opposing wall surfaces of the guide rails 106.

This piezoelectric linear motor can move in the direction indicated by A or in a reverse direction in a worm-like fashion by sequentially changing the timing in which a voltage is applied to the first to third laminated piezoelectric elements 101, 102a, 102b, 103a and 103b according to a predetermined pattern. Hence, the distance through which the piezoelectric linear motor moves can be increased by increasing the length of the guide rails 106.

The aforementioned conventional piezoelectric linear motor employs laminated type piezoelectric elements. However, the laminated type piezoelectric elements have a low mechanical accuracy for reasons involving the structure and manufacturing method thereof, and thus cannot provide a stable operation accuracy. More specifically, since the laminated type piezoelectric element is manufactured by laying tens or hundreds of piezoelectric plates on top of one another and then bonding them using an adhesive, the thickness thereof varies. Moreover, the displacement of the laminated type piezoelectric element is not large. For these reasons, the pressing force of the laminated type piezoelectric element against the guide rail varies, reducing positional accuracy or causing operational disability. Furthermore, the use of the laminated type piezoelectric elements increases the thickness of the motor, which makes it difficult to reduce the size of the motor.

In imaging devices, such as video cameras, which employ a rear focus type zoom lens, an electromagnetic motor, such as a step motor or a voice coil motor, is used as the focusing motor (U.S. Pat. No. 4,920,369). When the step motor is used as the focusing motor, it is not necessary to provide a lens position detection device, because lens position can be detected by counting the number of driving pulses. However, the step motor is large in size and the use thereof makes reduction of a lens unit impossible. The use of other types of electromagnetic motor makes reduction in the size of the motor possible. However, it requires provision of a lens position detection device, and hence makes reduction in size of the motor impossible. Reduction in the size of an imaging element (CCD) has increased the demand for a fine lens positioning operation. However, a combination of an electromagnetic motor, such as a step motor, and a transmission mechanism, such as a feed screw mechanism, cannot achieve the required accurate lens positioning.

SUMMARY OF THE INVENTION

According to one aspect of this invention, there is provided a piezoelectric motor which includes at least two first actuators for clamping, and a second actuator for changing a distance between the first actuators. The first and second actuators are driven alternately for moving a moving member. Since the first actuators employ a bimorph type piezoelectric element, a highly accurate operation can be achieved, and variations in the quality can be eliminated during mass production.

Other objects and advantages of the present invention will become clear from the following description with reference to the accompanying drawings.

DETAILED DESCRIPTION OF THE PREFERRED EMBODIMENTS

A first embodiment of the present invention will be described below with reference to FIGS. 1 to 3.

Figure 1A:
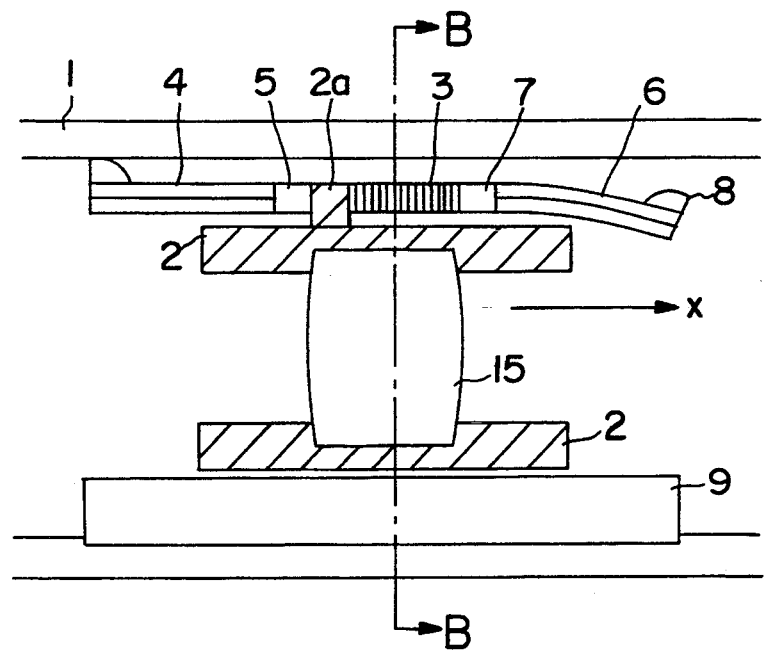
FIG. 1A is a longitudinal cross-sectional view of a lens barrel in which a first embodiment of a piezoelectric linear motor according to the present invention is incorporated.
Figure 1B:
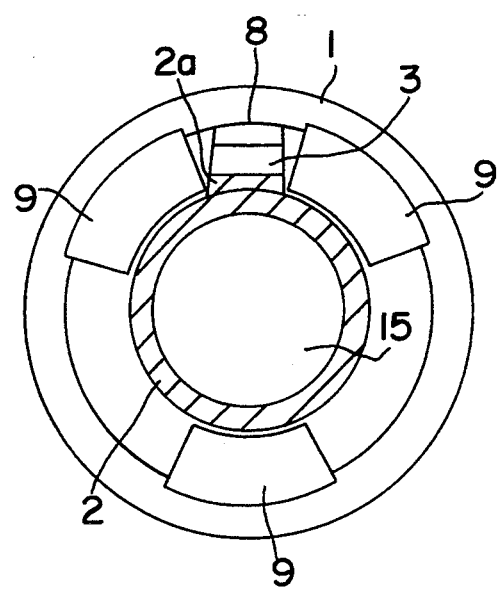
FIG. 1B is a section taken along a line B—B of FIG. 1A.
Figure 2A:
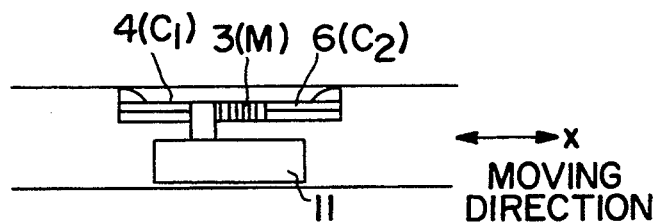
FIGS. 2A through 2G illustrate the operation of the linear motor.
Figure 2B:
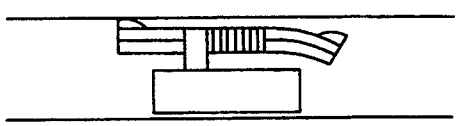
Figure 2C:
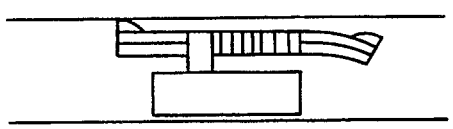
Figure 2D:
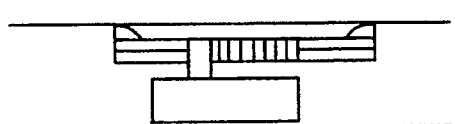
Figure 2E:
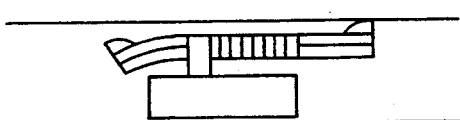
Figure 2F:
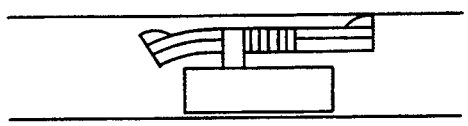
Figure 2G:
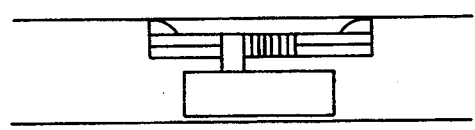

FIG. 1A is a cross-sectional view, taken along an optical axis, of a lens barrel which incorporates a first embodiment of a piezoelectric linear motor according to the present invention, and FIG. 1B is a section taken along a line B—B of FIG. 1A which is perpendicular to the optical axis. In FIGS. 1A and 1B, a lens barrel 1, serving as the reference for movement, incorporates a cylindrical lens retaining frame 2 for retaining a lens 15. The lens retaining frame 2 has a protrusion 2a on the outer peripheral surface thereof. A laminated type piezoelectric element 3, extending parallel to the optical axis (i.e., in the direction in which a movable portion is moved), is bonded in a cantilever fashion to the rear end surface of the protrusion 2a. A piezoelectric element mounting member 5 is fixed to the front end surface of the protrusion 2a, and a bimorph piezoelectric element 4, extending parallel to the optical axis, is bonded in a cantilever fashion to the front end surface of the mounting member 5.

A piezoelectric element mounting member 7, similar to the mounting member 5, is fixed to the rear end surface of the laminated type piezoelectric element 3, and the front end surface of a bimorph piezoelectric element 6, similar to the piezoelectric element 4, is fixed in a cantilever fashion to the mounting member 7. An engaging member 8 is fixed to the upper surface of the front end portion of the piezoelectric element 4 and of the rear end portion of the piezoelectric element 6. The engaging member 8 is made of a felt or the like and is pressed against the inner peripheral surface of the barrel 1.

A lens retaining frame supporting member 9, constituting the sliding surface of the lens retaining frame 2, is fitted to the inner peripheral surface of the barrel 1. The lens retaining frame supporting member 9 is made of, for example, iron. The inner peripheral surface of the supporting member 9 (which is in contact with the outer peripheral surface of the lens retaining frame 2) is subjected to fluororesin coating so as to reduce friction between the supporting member 9 and the lens retaining frame 2. The supporting member 9 is shown in this embodiment as three fan-shaped segment blocks disposed separately on the circumference having a center which is the axis of the barrel 1, as shown in FIG. 1B. Two of these blocks have a function of guiding the protrusion 2a so that the protrusion 2a can move only in the direction of the optical path (i.e., so that the lens retaining frame 2 caanot be rotated).

The operation principle and operation states of the piezoelectric linear motor will be described below with reference to FIGS. 1 to 3.

Figure 3:
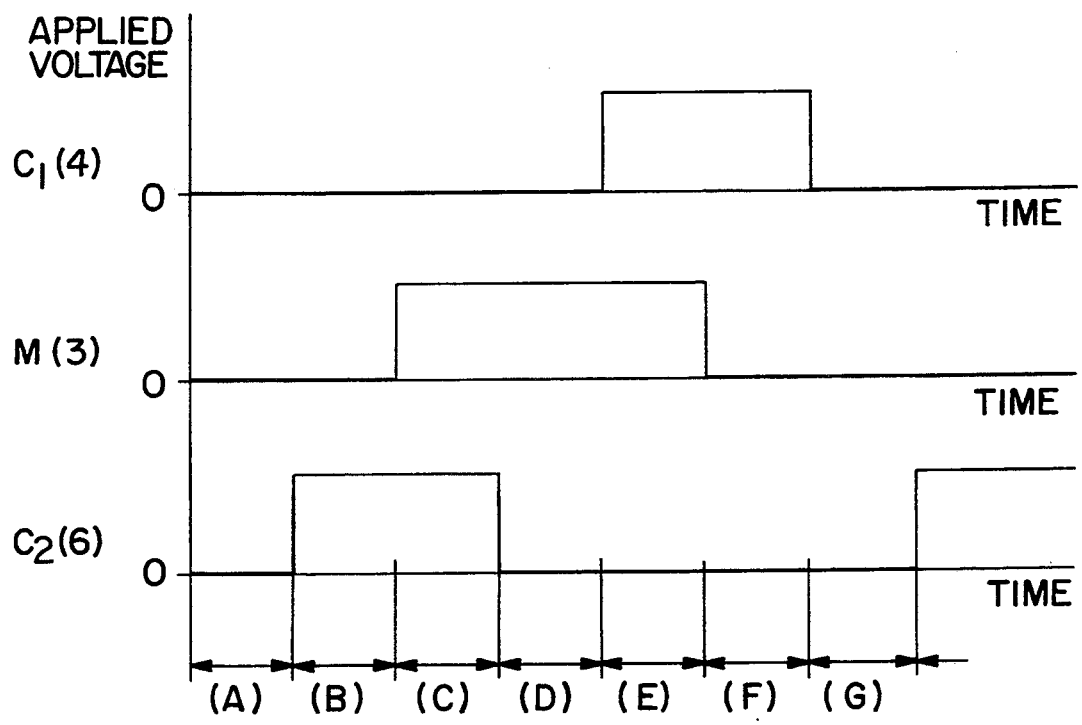
FIG. 3 shows a pattern of application of a voltage to the linear motor.

FIGS. 2A to 2G schematically show the respective operation states of the piezoelectric linear motor, and FIG. 3 shows an example of a pattern of voltage applied to perform the worm-like motion.

(2A) No voltage is applied to the piezoelectric actuators, and clamping is made by the bimorph type piezoelectric actuators 4 and 6 (hereinafter respectively denoted by $C_1$ and $C_2$).

(2B) A voltage is applied to $C_2$ to bend it and thereby release clamping by $C_2$. Clamping is therefore made only by $C_1$.

(2C) While the state shown in (B) is maintained, a voltage is applied to the laminated type piezoelectric actuator 3 for linear motion (hereinafter denoted by M) to expand M and thereby move $C_2$ mounted on M in the direction indicated by x.

(2D) Application of the voltage to $C_2$ is stopped to restore $C_2$. Consequently, clamping by $C_2$ is made again.

(2E) A voltage is applied to $C_1$ to bend it and thereby release clamping by $C_1$. Consequently, clamping is made only by $C_2$.

(2F) While the state shown in (E) is maintained, application of the voltage to M is stopped to contact M and thereby move $C_1$ and a movable portion 11 in the direction indicated by x.

(2G) Application of the voltage to $C_1$ is stopped to restore $C_1$ to its original state shown in (A).

The respective piezoelectric elements can move together with the movable portion 11 in the direction indicated by x a distance corresponding to the amount of expansion of the linear motion piezoelectric element M by conducting a cyclic operation consisting of the aforementioned processes (A) through (G). By reversing the voltage application pattern including the processes (A) through (G), the piezoelectric elements and the movable portion 11 move in the direction indicated by −x. The distance through which the piezoelectric elements and the movable portion 11 move per one cycle can be adjusted by adjusting the magnitude of the voltage applied to the linear motion piezoelectric element M. In this embodiment, there is a time in one cycle during which the moving mechanism, containing one set of piezoelectric elements ($C_1$, $C_2$, M), does not move Hence, the moving mechanism makes an intermittent motion. To avoid this intermittent motion, two or more sets of piezoelectric elements may be provided around the optical axis.

As stated above, since the bimorph type clamping piezoelectric actuators are used for clamping in this embodiment, the amount of displacement is large, and variations in the dimension in the direction of displacement can be eliminated, substantially eliminating variations in the pressing force and thus providing complete form of worm-like motion, as compared with the conventional laminated type piezoelectric actuators. Also, the use of the bimorph type actuators readily allows for reduction in the size of the linear motor in the radial direction. Furthermore, since felt is used to form the pressing portions, generation of noises or vibrations can be reduced.

In the first embodiment, the moving mechanism is of the sliding type. However, a bar sleeve type moving mechanism can also be used.

Figure 6:
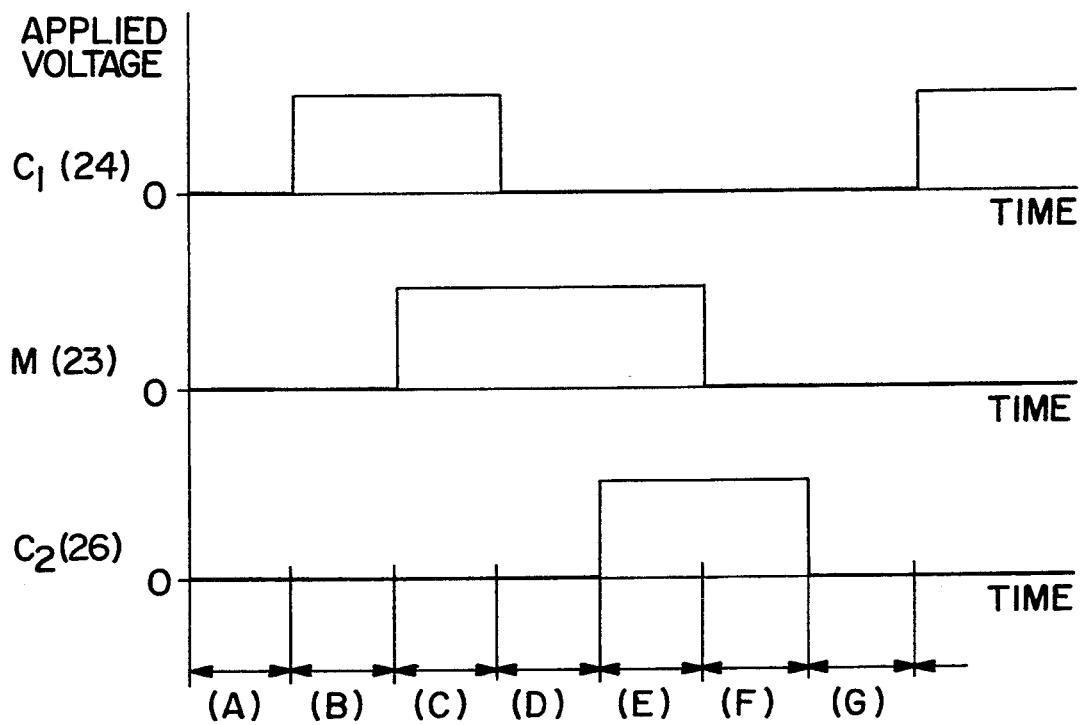
FIG. 6 shows a pattern of application of a voltage to the linear motor shown in FIGS. 4A and 4B.
Figure 4A:
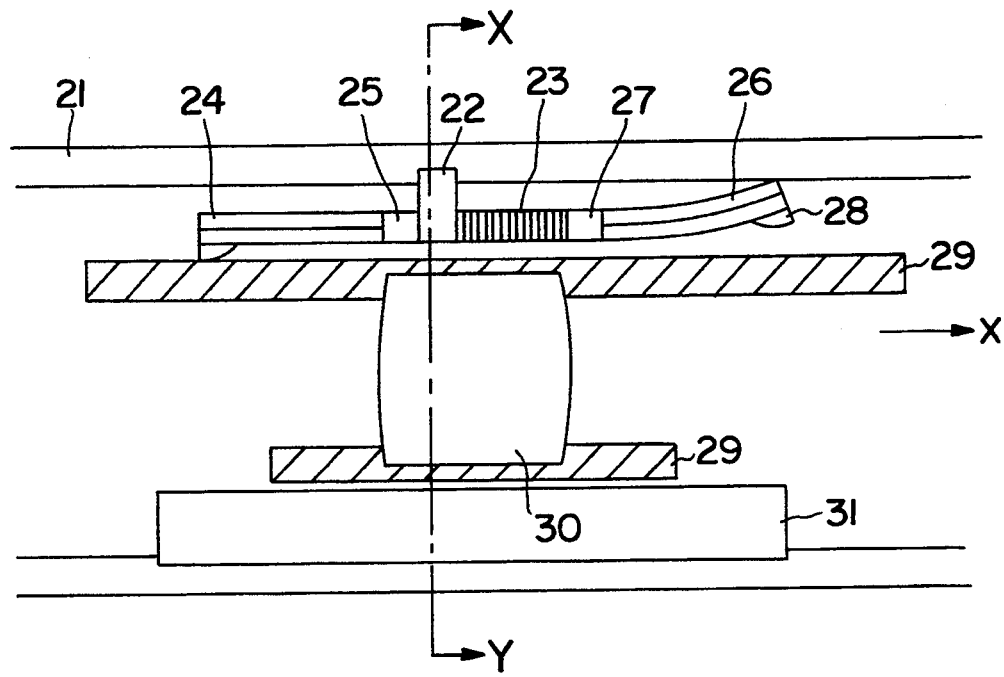
FIG. 4A is a longitudinal cross-sectional view of a lens barrel in which a second embodiment of the piezoelectric linear motor according to the present invention is incorporated.
Figure 4B:
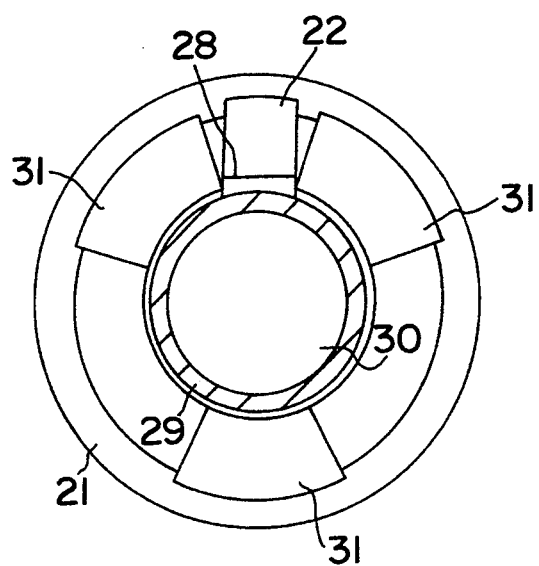
FIG. 4B is a section taken along a line B—B of FIG. 4A.
Figure 5A:
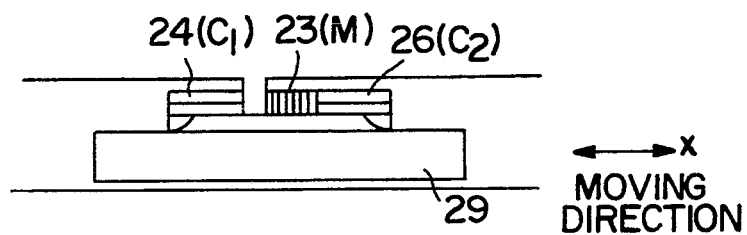
FIGS. 5A through 5G illustrate the operation of the linear motor shown in FIGS. 4A and 4B.
Figure 5B:
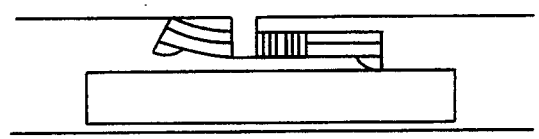
Figure 5C:
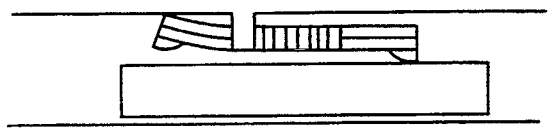
Figure 5D:
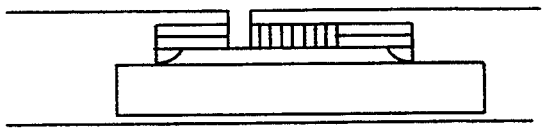
Figure 5E:
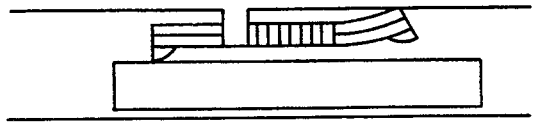
Figure 5F:
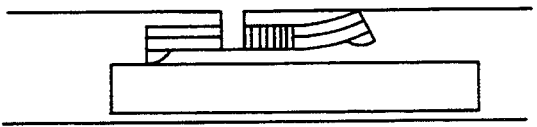
Figure 5G:
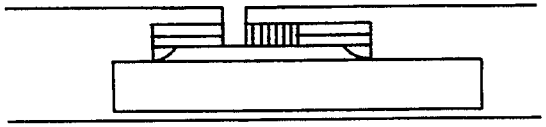

A second embodiment of the present invention will be described below with reference to FIGS. 4 through 6. In this second embodiment, a linear motor is incorporated in a lens barrel which requires the movement of a lens, as in the case of the first embodiment. However, unlike the first embodiment, the piezoelectric elements are provided on the barrel to move the lens retaining frame (including the lens). FIG. 4A is a cross-sectional view, taken in the direction of the optical axis, of the lens barrel, and FIG. 4B is a section taken along a line of X-Y of FIG. 4A, which is perpendicular to the optical axis. A lens barrel 21 has a protrusion 22 which may be adhered to the barrel 21. A laminated type piezoelectric actuator 23 is fixed to the protrusion 22 parallel to the optical axis (i.e., in the direction in which the actuator 23 is moved) by an adhesive or the like in such a manner that it can expand and contract. Bimorph type piezoelectric actuators 24 and 26 are fixed to the laminated type piezoelectric actuator 23, as in the case of the first embodiment. An engaging member 28, made of felt or the like, is mounted on the bimorph type piezoelectric actuators 24 and 26. A lens 30 is retained by a lens retaining frame 29. The lens retaining frame 29 is slidably supported by a lens retaining frame supporting member 31 having a sliding surface along which the lens retaining frame 29 is caused to slide. The sliding surface of the supporting member 31 is subjected to fluororesin coating. The supporting member 31 is the same as the lens retaining frame supporting member 9 employed in the first embodiment, and is fixed to the inner peripheral surface of the barrel 1.

The principle of the operation of the piezoelectric linear motor arranged in the manner described above will be described below with reference to FIGS. 5 and 6. FIGS. 5A through 5G schematically show the respective operation states of the linear motor, and FIG. 6 is an example of a pattern of voltage applied to operate the linear motor in the manner shown in FIG. 5.

(5A) No voltage is applied to the respective piezoelectric actuators, and the lens retaining frame 29 is clamped by the bimorph type piezoelectric actuators 24 and 26 (hereinafter respectively denoted by $C_1$ and $C_2$).

(5B) A voltage is applied to $C_1$ to bend it and thereby release clamping made by $C_1$. Consequently, the lens retaining frame 29 is clamped only by $C_2$.

(5C) While the state shown in (B) is maintained, a voltage is applied to the linear motion laminated type piezoelectric actuator 23 (hereinafter denoted by M) to expand M and thereby move $C_2$ and the lens retaining frame 29 clamped by $C_2$ in the direction indicated by x.

(5D) Application of the voltage to $C_1$ is stopped to restore the original shape to $C_1$, and $C_1$ thus clamps the lens retaining frame 29 again.

(5E) Next, a voltage is applied to $C_1$ to bend it and thereby release clamping by $C_2$. Consequently, the lens retaining frame 29 is clamped by $C_1$ alone.

(5F) Application of the voltage to M is stopped to contract it and thereby return M to its original position.

(5G) Finally, application of the voltage to $C_2$ is released to restore the original shape to $C_2$ and thereby obtain the original state indicated by (A).

The lens retaining frame 29 which is the movable portion can move in the direction indicated by distance x corresponding to the amount of expansion of the linear motion piezoelectric element M by conducting a cyclic operation consisting of the aforementioned processes (A) through (G). By reversing the voltage application pattern including the processes (A) through (G), the lens retaining frame 29 moves in the direction indicated by —x. The distanace through which the lens retaining member 29 moves per one cycle can be adjusted by adjusting the magnitude of the voltage applied to the linear motion piezoelectric element M. In this embodiment, there is a time in one cycle during which the moving mechanism containing one set of piezoelectric elements ($C_1$, $C_2$, M) does not move. Hence, the moving mechanism makes an intermittent motion. To avoid this intermittent motion, two or more sets of piezoelectric elements may be provided around the optical axis.

As stated above, since the bimorph type clamping piezoelectric actuators are used for clamping in this embodiment, the amount of displacement is large, and variations in the dimension in the direction of displacement can be eliminated, substantially eliminating variations in the pressing force and thus providing an accurate worm-like motion, as compared with the conventional laminated type piezoelectric actuators. Also, the use of the bimorph type actuators readily allows for reduction in the size of the linear motor in the radial direction. Furthermore, since felt is used to form the pressing portions, generation of noises or vibrations can be reduced. Furthermore, in this embodiment, since the driving portion is provided on the barrel and the movable portion is thereby constituted of the lens retaining member and the lens, the weight of the movable portion is reduced and movement thereof is made easy. In the second embodiment, the moving mechanism is of the sliding type. However, a bar sleeve type moving mechanism can also be used.

Figure 7:
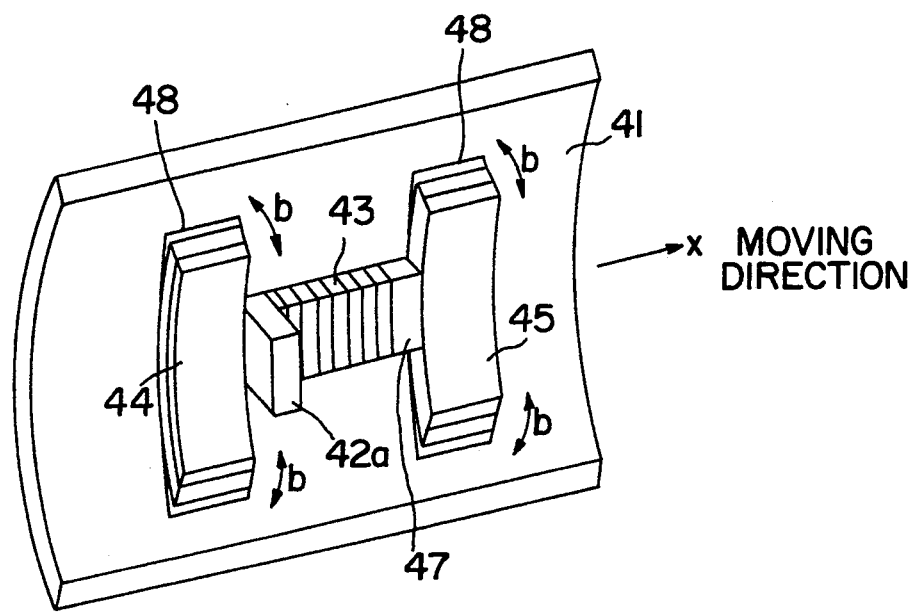
FIG. 7 is a perspective view of a lens barrel in which a third embodiment of the piezoelectric linear motor according to the present invention is incorporated.
Figure 8:
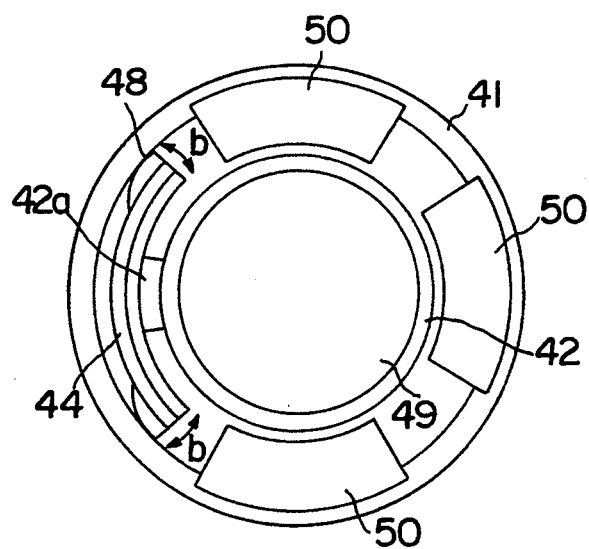
FIG. 8 is a lateral cross-sectional view of the lens barrel of FIG. 7.

A third embodiment of the present invention will be described below with reference to FIGS. 7 and 8. In the third embodiment, the piezoelectrid linear motor according to the present invention is incorporated in a lens barrel which requires movement of a lens, and bimorph type piezoelectric actuators curved at the same curvature as that of the barrel are employed for clamping. FIG. 7 is a perspective view of a driving portion of this embodiment, and FIG. 8 is a lateral cross-sectional view thereof. In FIGS. 7 and 8, a lens barrel 41 accommodates a lens retaining frame 42 having a protrusion 42a. A laminated type piezoelectric acturator 43 is fixed to the protrusion 42a by an adhesive or the like in such a manner that it can expand and contract in the direction of the optical axis (i.e., in the direction of movement). A bimorph type piezoelectric actuator 44 curved at the same curvature as that of the lens barrel 41 is fixed by an adhesive or the like to a fixing member (not shown) mounted on the protrusion 42a of the lens retaining frame 42 in such a manner that it bends in the radial direction (indicated by arrows b) by an applied voltage. A bimorph type piezoelectric actuator 45 curved at the same curvature as that of the lens barrel 41 is fixed by an adhesive or the like to a fixing member 47 mounted to a free end portion of the laminated type piezoelectric actuator in such a manner that it bends in the radial direction (indicated by arrows b) when a voltage is applied thereto. Engaging portions 48 are pressed against the lens barrel 41 when the bimorph type piezoelectric actuators are bent. The engaging portions 48 may be made of felt. A lens 49 is retained by the lens retaining frame 42. The lens retaining frame 42 is supported by a lens retaining frame supporting member 50 so as to be slidable in the direction of the optical axis. The supporting member 50 has the same structure as that of the lens retaining frame supporting member 9 employed in the first embodiment. It is not necessary to provide the support member 50 over the entire circumference about the optical axis, as in the case of each embodiment.

Since principle of the operation of the third embodiment is the same as that of the first embodiment, description thereof is omitted.

In the third embodiment arranged in the manner described above, the same advantages as those of the first embodiment can be obtained. Moreover, the linear motor can be made compact. The mechanism is of the sliding type. However, a bar sleeve type moving mechanism can also be used.

Figure 9:
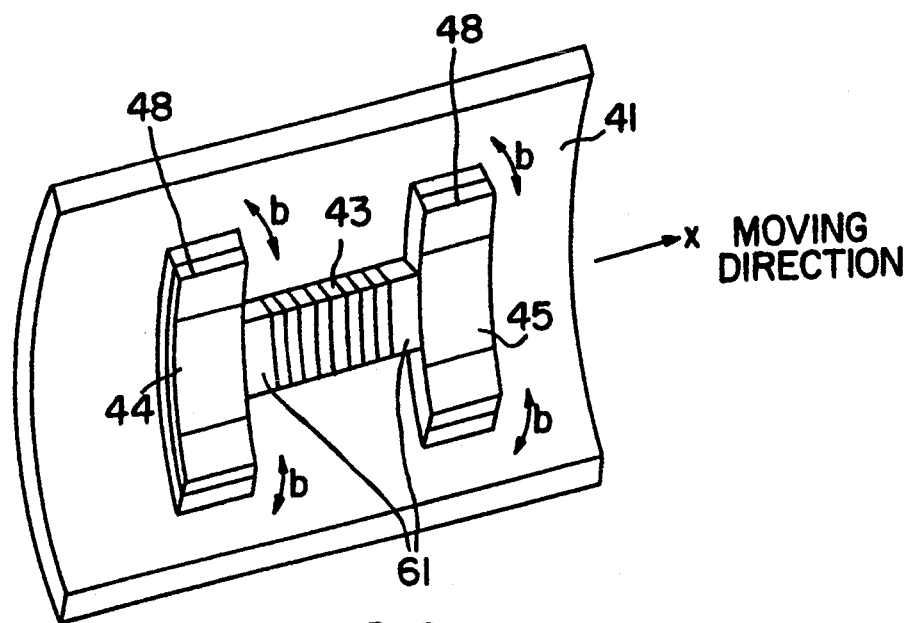
FIG. 9 is a perspective view of a lens barrel in which a fourth embodiment of the piezoelectric linear motor according to the present invention is incorporated.
Figure 10:
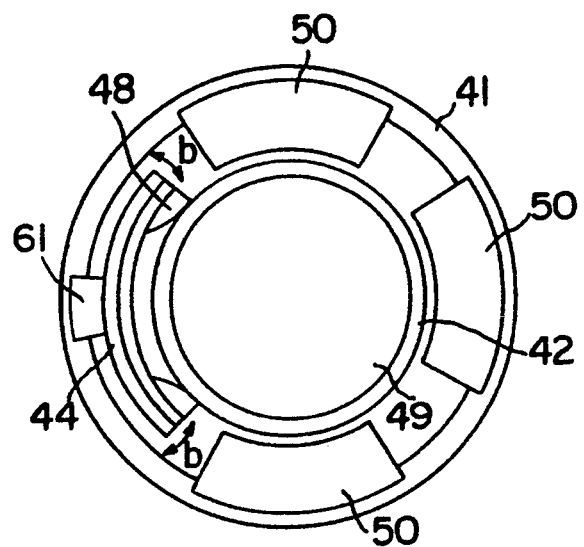
FIG. 10 is a lateral cross-sectional view of the lens barrel of FIG. 9.
Figure 11:
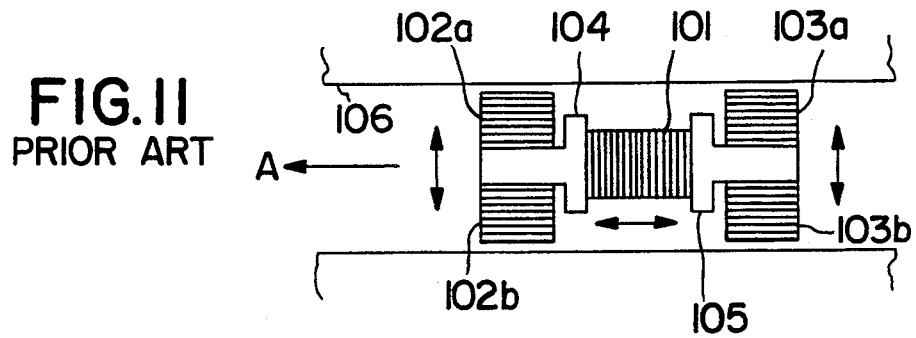
FIG. 11 is a schematic view of a conventional piezoelectric linear motor or a piezoelectric element type moving mechanism.

A fourth embodiment of the present invention will be described below with reference to FIGS. 9 and 10. This fourth embodiment is characterized in that the advantages of the second and third embodiments can be obtained by providing the driving portion employed in the third embodiment on the barrel, as in the case of the second embodiment. In FIGS. 9 and 10, the same reference numerals are used to denote members which are the same as those shown in FIGS. 7 and 8, and description thereof is omitted. The operation of the fourth embodiment will also be omitted.

In FIGS. 9 and 10, reference numeral 61 denotes a protrusion fixed to the barrel 41 by an adhesive or the like.

As will be understood from the foregoing description, the piezoelectric linear motor according to the present invention employs as clamping piezoelectric actuators a bimorph type piezoelectric element which has high processing accuracy, which allows for easy quality management, and which assures a large amount of displacement and a large force. Consequently, a highly accurate operation can be obtained, and uniform products can be mass produced, as compared with conventional type of piezoelectric linear motors. Furthermore, the linear motor according to the present invention can be made lighter in weight and smaller in size than the conventional piezoelectric linear motor and can be mass produced and put into practical use.

A fifth embodiment of the present invention will be described below with reference to FIGS. 12 to 15. The fifth embodiment employs the aforementioned piezoelectric linear motor as the driving source for a movable lens of a rear focus type optical system.

Figure 12:
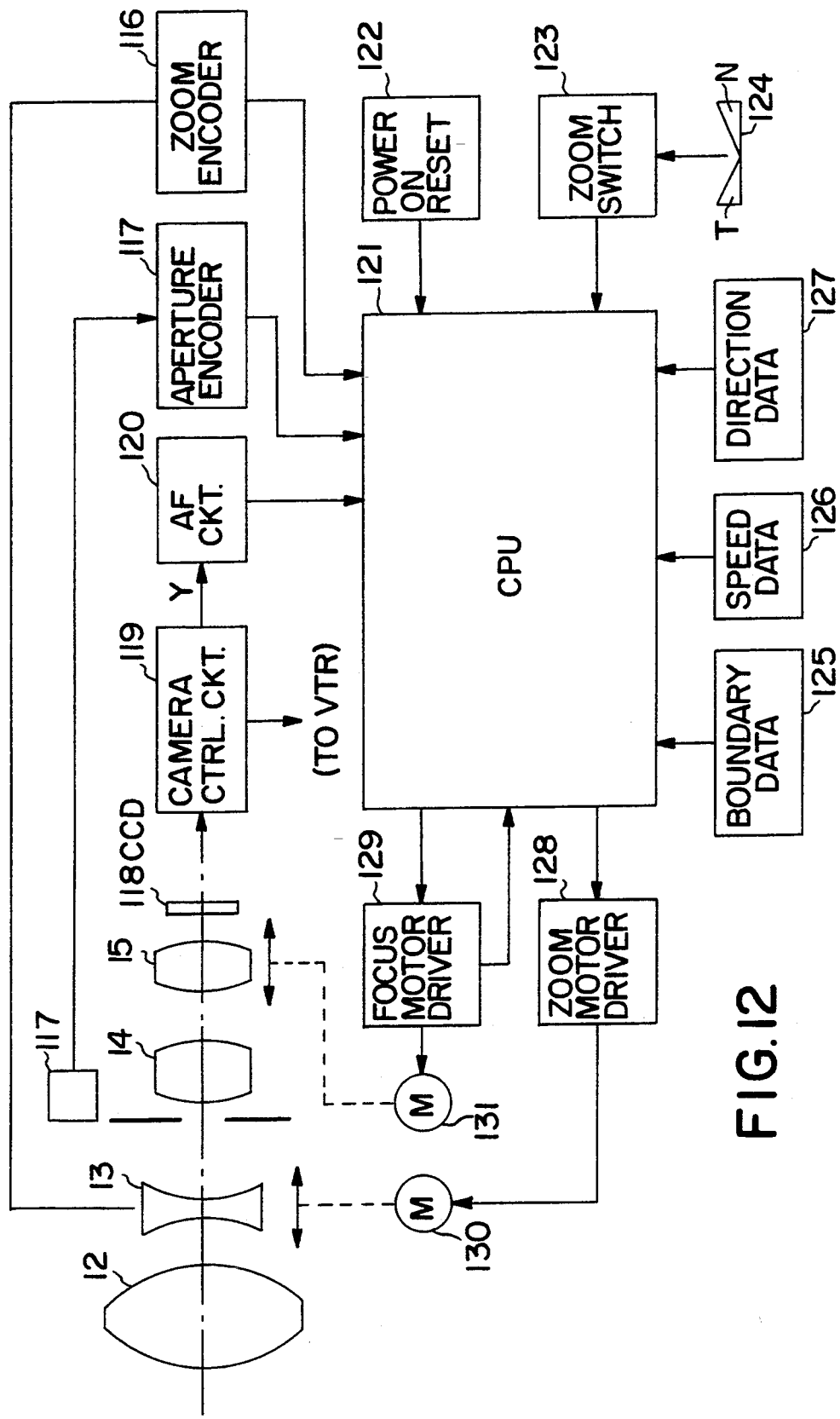
FIG. 12 is a block diagram of a video camera having a rear focus type optical system in which a focusing lens is driven using a piezoelectric linear motor, showing a fifth embodiment of the present invention.

FIG. 12 is a block diagram of a video camera. In FIG. 12, reference numeral 12 denotes a fixed front lens group; 13, a variator lens group for changing magnification; 14, a fixed lens group; 15, a focusing (compensator) lens group located closest to an image plane for both focusing and correcting a shift of the position of the image plane which is generated by the movement of the variator lens group 13; 116, a zoom encoder for detecting the position of the variator lens group 13, which may be a volume encoder in which a brush formed integrally to a variator moving ring slides along the substrate on which a resistor pattern is printed; 117, an aperture encoder 117 for detecting an aperture value, which may be of the type which employs the output of a Hall element provided in an aperture meter; 118, an imaging device, such as a CCD; 119, a camera processing circuit; 120, an AF circuit into which a Y signal is input from the camera processing circuit 119, the AF circuit determining whether or not the lens is focused and determining the direction in which the lens is moved to focus it and the distance through which the lens is moved, if it is determined that the lens is not focused; 121, a CPU for receiving the results of these determinations; 122, a power on reset circuit for conducting various resetting operations when the power is switched on; 123, a zoom operation circuit for transmitting the operation of a zoom switch 124 by an operator to the CPU 121; 125 to 127, memories for storing the data on the movement of the focusing lens 15, the memories including a direction data memory 127, a speed data memory 126, a boundary data memory 125; 128, a zoom motor driver; 129, a focus motor driver for counting the number of voltage application cycles and inputting the results to the CPU 121 as the absolute position of the focus lens; 130, a zoom motor which may be a DC motor; and 131, a focus motor which is the aforementioned piezoelectric linear motor.

Figure 13A:
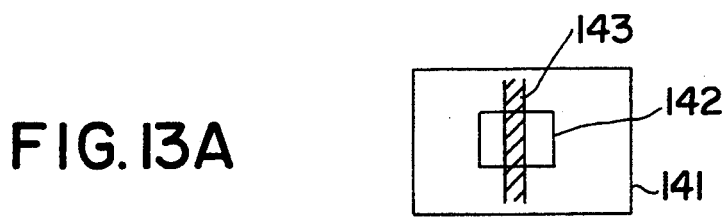
FIGS. 13A to 13C illustrate the operation of an AF device used in the fifth embodiment.
Figure 13B:
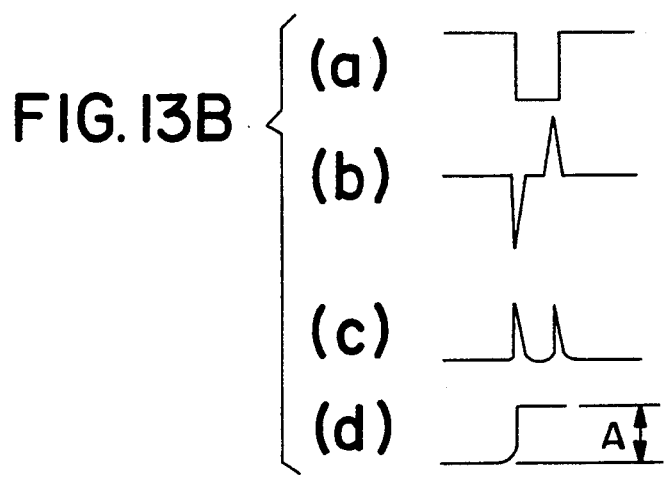
Figure 13C:
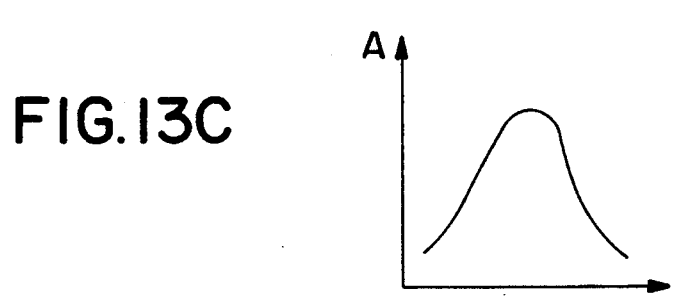

The automatic focusing detecting method employed in the lens driving device of this embodiment will now be described with reference to FIGS. 13A to 13C. Reference numeral 141 denotes an entire screen of the video camera; and 142, an area used for measuring the distance to an object. In the automatic focusing detecting method employed in this embodiment, the contrast of an image is detected. That is, an unsharpness is detected by processing the output of an image having a contrast indicated by, for example, 143. FIG. 13B (a) shows a video signal of the image 143 which is output from the imaging device, FIG. 13B (b) shows the differential waveform of that video signal, FIG. 13B (c) shows the absolute form of the differential waveform, and FIG. 13B (d) shows the signal level A (evaluated value) obtained by integrating the absolute waveform. When the image 143 is sharp, a high level signal is obtained. When the image 143 is unsharp, the signal level becomes low. Hence, the position B of the focus lens group which is in a focused state can be detected by detecting the position of the highest signal level A, as shown in FIG. 13C.

Figure 14A:
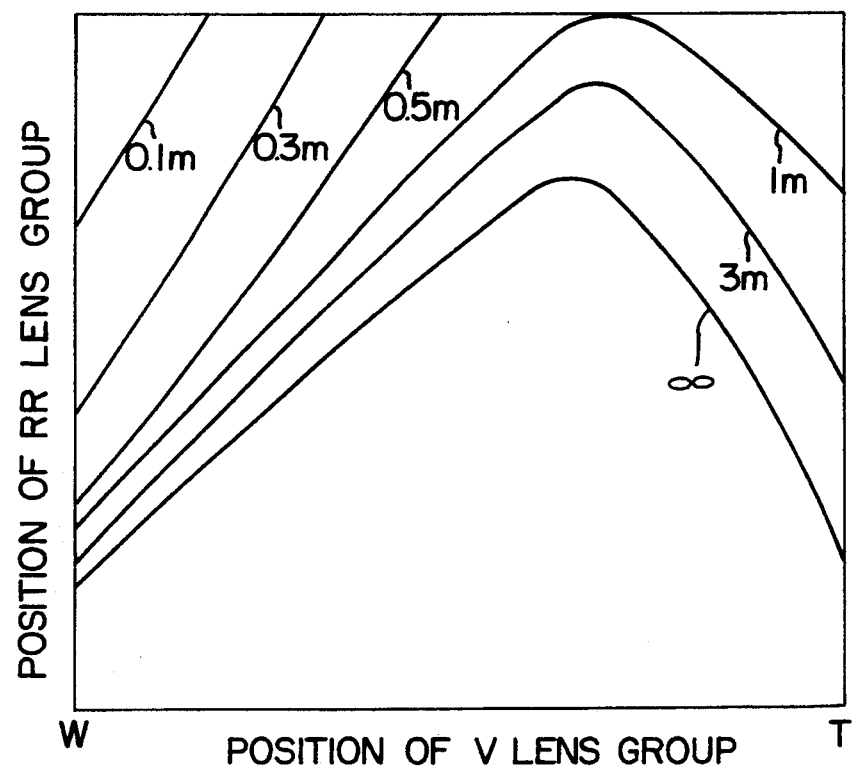
FIGS. 14A and 14B show the moving track of the lenses used in the fifth embodiment.
Figure 14B:
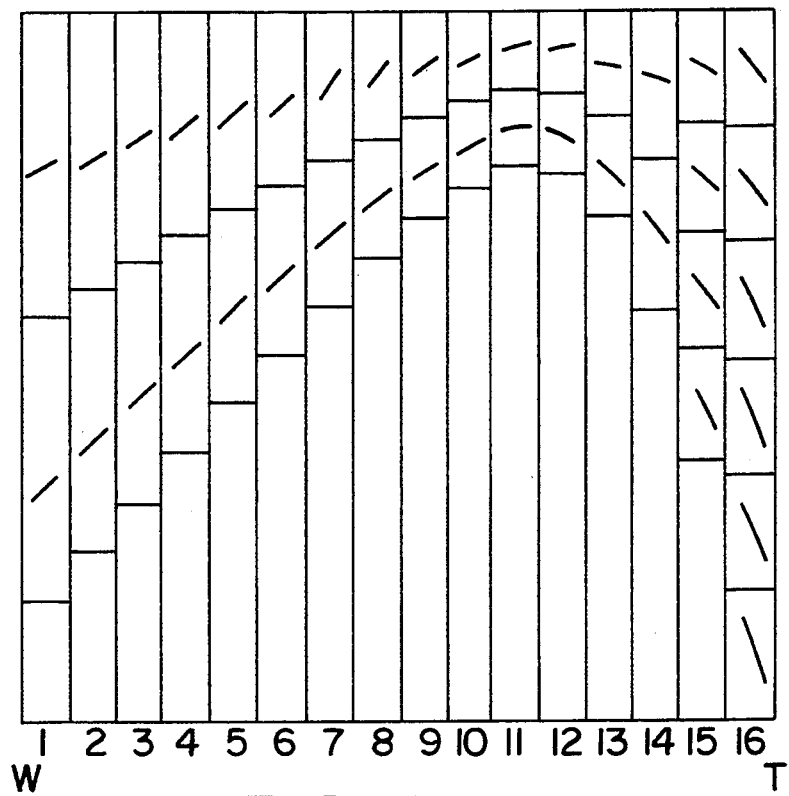

In the optical system according to the present embodiment which is a so-called rear focus zoom lens in which the single correcting lens group has both the focusing and compensator functions, the moving track of that correcting lens group varies according to the distance of the object, unlike the conventional zoom lens system which has a focusing lens group and a compensator lens group separately and in which the moving track of the compensator lens group can be determined only in one way. This is shown in FIG. 14A. In the graph shown in FIG. 14A, the abscissa axis represents the position of the variator lens group 13, i.e., the focal point, and the ordinate axis represents the position of the focus lens group 15. W on the left indicates the wide angle end, and T on the right indicates the telephoto end. As can be seen from the graph shown in FIG. 14A, the moving track of the focus lens group 15 varies according to the distance of the object. To make the focus lens group 15 follow the continuous movement of the variator lens group 13 on a real time basis while maintaining the focus lens group 15 focused, the focal length range is divided into a plurality of zones in the manner shown in FIG. 14B according to the characteristics shown in FIG. 14A, and a typical speed (reference speed) of the focus lens group 15 is stored for each zone. In this embodiment, the variator lens group 13 is moved at a fixed speed for zooming. According to this embodiment, when the lens is focused before zooming is initiated, the moving speed and moving direction of the focus lens group 15 can be determined from the position of the variator and focus lens group 13 and 15 and the zooming direction, and the focus lens group can be moved accordingly without delay.

Figure 15:
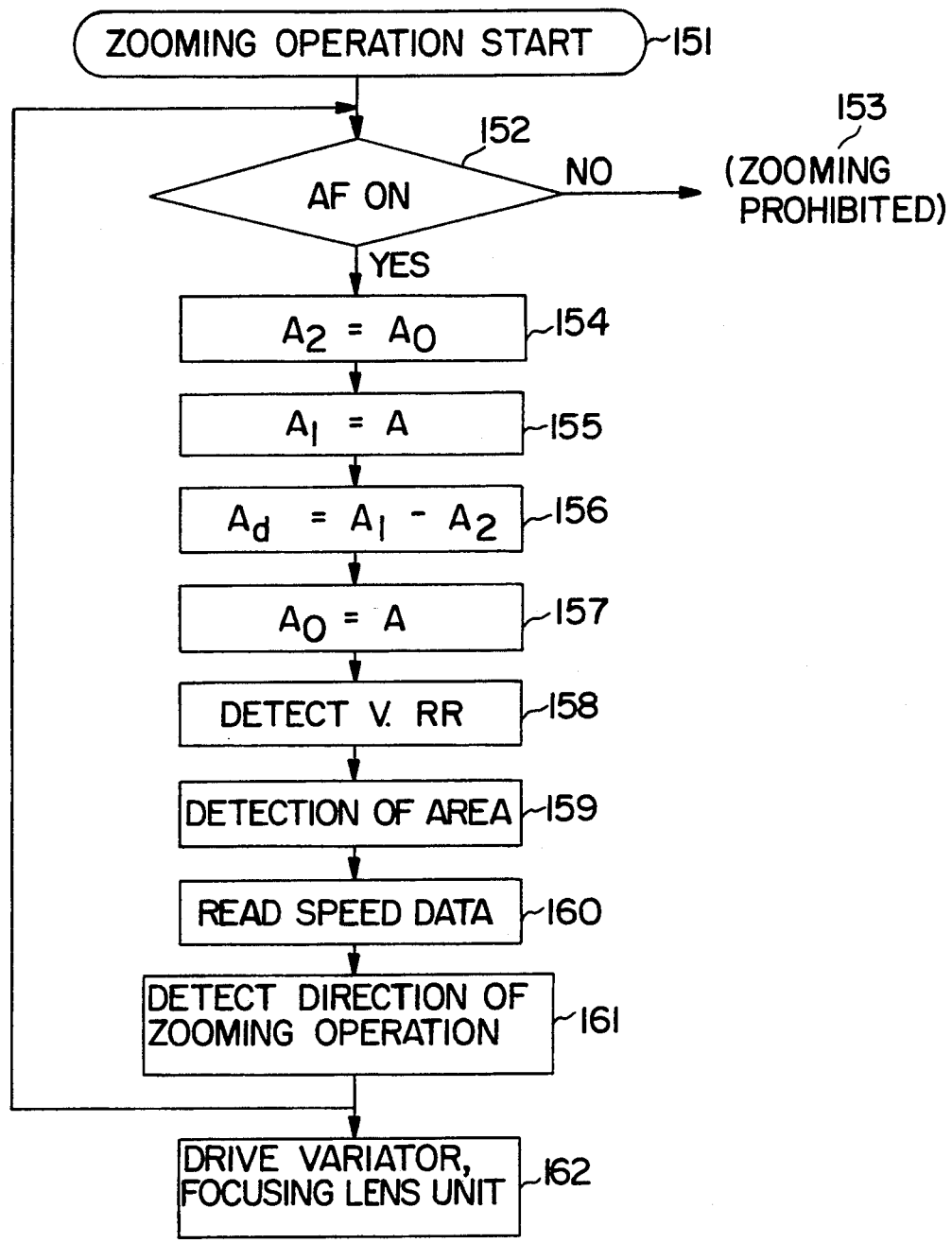
FIG. 15 is a flowchart showing the circuit operation in the fifth embodiment.

FIG. 15 is a flowchart of the lens driving control operation procedures executed by the CPU 121.

In step 151, the routine is initiated when the zoom button or the like is operated. In this routine, step 152 and the subsequent steps are repeated in, for example, 1/60 sec. When the operation of the zoom button or the like is suspended or when the variator lens group has been moved to the end of the movable range, the routine is suspended.

After the routine is initiated in step 151, it is determined in step 152 whether or not the AF circuit 120 is operable. If the AF circuit 120 is not operated, the zooming operation is prohibited in step 153. Hence, when the AF circuit 120 is not operable zooming is not conducted even if the zoom button or the like is operated. When the AF circuit is operable, the process goes to step 154.

In step 154, the previous unsharpness evaluating value $A_0$ is stored in $A_2$. When the zooming operation is initiated, since no unsharpness evaluation is conducted, 0 is stored in $A_2$.

In step 155, the present unsharpness evaluating value A is stored in $A_1$. In step 156, ($A_1$ to $A_2$) is stored in Ad. In step 157, A is stored in $A_0$ so that it can be used as the previous unsharpness evaluating value in a subsequent routine.

Next, in step 158, the point (V, BR) on the map shown in FIG. 14A is detected from the present point (V) of the variator lens group 13 and the present position (RR) of the focus lens group 15. In step 159, the area to which the point (V, BR) belongs, detected in step 158, is detected. In step 160, the typical area speed as well as the speeds which ensure that the lens is not focused are read out. Next, in step 161, the direction in which the zoom switch (T,W) is operated, i.e., toward the wide angle or telephoto end, is input to the CPU 121.

Next, in step 162, the CPU 121 determines the direction in which the focus motor 131 is moved to drive the focus lens group 15 from the read out data and the unsharpness data read from the AF circuit 120, and the direction in which the motor 130 is driven to drive the variator lens group in accordance with the results of the operation of the zoom switch. Thereafter, the CPU 121 drives the focus motor driving circuit 129 and the zoom motor driver 128 in such a manner that both the motors can be moved almost simultaneously. The aforementioned piezoelectric motor changes its moving speed in accordance with the voltage applied to the piezoelectric element M and the driving step. That is, the voltage applied to the piezoelectric element M and the driving step are stored in the memory as the speed data 126.

In this embodiment, the moving mechanism is of the sliding type. However, a bar sleeve type moving mechanism may also be used.

In this embodiment, a DC motor and a volume encoder are respectively used as the zoom motor and the zoom encoder. However, the piezoelectric linear motor used as the focusing motor may be used as the zooming motor. In that case, an encoder function may be provided by counting the number of driving pulses.

As will be clear from the foregoing description, when the actuators which utilize the bimorph type piezoelectric elements are used as the lens driving means for a video camera or the like, the optical apparatus can be made small in size. Also, fine lens positioning is made possible.

What is claimed is:

1. A motor for driving a moving member with respect to a member which serves as a reference of the movement, said motor comprising:

engaging means supported by one of said reference member and said moving member, and including at least two first piezoelectric actuators for selectively operating a contact portion of said piezoelectric actuators such that said contact portion selectively is brought into contact with or is moved away from the other one of said reference member and said moving member; and at least one second piezoelectric actuator operable to change a distance between said a least two first piezoelectric actuators, wherein at least one of said at least two first piezoelectric actuators employs a bimorph type piezoelectric element.

2. A motor according to claim 1, wherein said reference member comprises a cylindrical member, and said moving member moves along a peripheral surface of said cylindrical member.

3. A motor according to claim 2, wherein said at least two first actuators are aligned in an axial direction so that said moving member is movable in the axial direction.

4. A motor according to claim 1, wherein said moving member comprises an optical element.

5. A motor according to claim 1, wherein the contact portion of said at least two first piezoelectric actuator operates in a direction substantially perpendicular to a direction of movement of said moving member.

6. A motor according to claim 5, wherein said moving member comprises an optical element.

7. An optical apparatus, comprising:

a movable lens movable in a direction of an optical axis; and a driving means for driving said movable lens in the direction of the optical axis, said driving means including a motor for driving said movable lens with respect to a member which serves as a reference of the movement, said motor including engaging means supported by one of said reference member and said movable lens, and including at least two first piezoelectric actuators for operating a contact portion of said piezoelectric actuators such that said contact portion selectively is brought into contact with or is moved away from the other one of said reference member and said movable lens, and at least one second piezoelectric actuator operable ot change a distance between said at least two first piezoelectric actuators, at least one of said at least two first piezoelectric actuators employing a bimorph type piezoelectric element.

8. A motor according to claim 7, wherein said reference member comprises a cylindrical member, and said moving member moves along a peripheral surface of said cylindrical member.

9. A motor according to claim 7, wherein said at least two first actuators are aligned in the axial direction so that said moving member is movable in the direction of the optical axis.

10. An optical apparatus, comprising:

a first movable lens which is movable in a direction of an optical axis for zooming;

a second movable lens which is movable in the direction of the optical axis, said second movable lens serving as a compensator for focusing and zooming; and a driving means for driving at least one of said first movable lens or said second movable lens in the direction of the optical axis, said driving means including a motor for moving said movable lens with respect to a member which serves as a reference of the movement, said motor including engaging means supported by one of said reference member and said driven movable lens, and including at least two first piezoelectric actuators for operating a contact portion of said piezoelectric actuators such that said contact portion selectively is brought into contact with or is moved away from the other one of said reference member and said driven movable lens, and at least one second piezoelectric actuator operable to change a distance between said at least two first piezoelectric actuators, at least one of said at least two first piezoelectric actuators employing a bimorph type piezoelectric element.

11. An optical apparatus according to claim 10, wherein said reference member comprises a cylindrical member, and said moving member moves along a peripheral surface of said cylindrical member.

12. An optical apparatus according to claim 10, wherein said at least two first actuators are aligned in the axial direction so that said moving member is movable in the direction of the optical axis.

13. A motor according to claim 1, further comprising control means for varying a travelling speed of said moving member.

14. A motor according to claim 13, wherein said control means varies the travelling speed of said moving member by adjusting an amount of expansion/contraction of said at least one second piezoelectric actuator.

15. A motor according to claim 14, wherein said control means adjusts the amount of expansion/contraction by varying a voltage applied to said at least one second piezoelectric actuator.

16. An optical apparatus according to claim 7, further comprising control means for varying a travelling speed of said movable lens.

17. An optical apparatus according to claim 8, wherein said control means varies the travelling speed of said movable lens by adjusting an amount of expansion/contraction of said at least one second piezoelectric actuator.

18. An optical apparatus according to claim 17, wherein said control means adjusts the amount of expansion/contraction by varying a voltage applied to said at least one second piezoelectric actuator.

19. An optical apparatus according to claim 10, further comprising control means for varying a travelling speed of said at least one driven movable lens.

20. An optical apparatus according to claim 19, wherein said control means varies the travelling speed of said driven movable lens by adjusting an amount of expansion/contraction of said at least one second piezoelectric actuator.

21. An optical apparatus according to claim 20, wherein said control means adjust the amount of expansion/contraction by varying a voltage applied to said at least one second piezoelectric actuator.

22. A motor having a reference member, a moving member movable relative to the reference member, and an actuator portion provided on one of the reference member and the moving member, said motor comprising:

at least two first piezoelectric actuators of a bimorph type provided in said actuator portion, each said first piezoelectric actuators performing a bending motion which selectively produces a first state in which one end thereof is fixed and a free end is contacted to the other of said reference member and said moving member, to fix said moving member relative to said other member, and a second state in which said free end is not contacted to said other member; and at least one second piezoelectric actuator for effecting an expansion/contraction motion, said expansion/contraction motion varying a distance between said at least two first piezoelectric actuators in a direction of travel of said moving member; and control means for varying a travelling speed of said moving member in accordance with the expansion/contraction motion.

23. A motor according to claim 22, wherein said moving member is an optical element.

24. A motor according to claim 22, wherein the free end of said first piezoelectric member performs a bending motion in a direction of thickness thereof.

25. A motor according to claim 22, wherein the expansion/contraction motion of said second piezoelectric member is varied by adjusting an applied voltage.

* * * * *

UNITED STATES PATENT AND TRADEMARK OFFICE
CERTIFICATE OF CORRECTION

PATENT NO. : 5,365,296

DATED : November 15, 1994

INVENTOR(S) : Murakami et al.

It is certified that error appears in the above-indentified patent and that said Letters Patent is hereby corrected as shown below:

Cover Page

Item: [30]    Foreign Application Priority Date

"Oct. 30, 1990 [JP] Japan 2-2292510" should read --Oct. 30, 1990 [JP] Japan 2-292510--.

Column 1

Line 24, "drawback" should read --drawbacks--.

Column 6

Line 38, "piezoelectrid" should read --piezoelectric--.

Column 9

Line 17, "operated," should read --operable,--;
Line 19, "operable" should read --operable,--;
Line 32, "(V,BR)" should read --(V,RR)--.

UNITED STATES PATENT AND TRADEMARK OFFICE
CERTIFICATE OF CORRECTION

PATENT NO. : 5,365,296

DATED : November 15, 1994

INVENTOR(S) : Murakami et al.

It is certified that error appears in the above-indentified patent and that said Letters Patent is hereby corrected as shown below:

Column 10

Line 18, "a" (second occurrence) should read --at--;
    Line 34, "actuator" should read --actuators--.

Column 12

Line 16, "adjust" should read --adjusts--;
    Line 26, "actuator" should read --actuators--.

Signed and Sealed this

Twenty-sixth Day of December, 1995

Attest:

BRUCE LEHMAN

*Attesting Officer*   *Commissioner of Patents and Trademarks*